US009818068B2

(12) United States Patent
Hogg et al.

(10) Patent No.: US 9,818,068 B2
(45) Date of Patent: Nov. 14, 2017

(54) METRICS BASED DESIGN METHOD AND SYSTEM

(75) Inventors: Kerard R. Hogg, Melbourne (AU); Ahamed Jalaldeen, Karnataka (IN); Gandhi Sivakumar, Victoria (AU); Ram Viswanathan, Plano, TX (US)

(73) Assignee: International Business Machines Corporation, Armonk, NY (US)

(*) Notice: Subject to any disclaimer, the term of this patent is extended or adjusted under 35 U.S.C. 154(b) by 1229 days.

(21) Appl. No.: 13/078,214

(22) Filed: Apr. 1, 2011

(65) Prior Publication Data

US 2012/0253859 A1    Oct. 4, 2012

(51) Int. Cl.
| | |
|---|---|
| *G06Q 10/00* | (2012.01) |
| *G06Q 10/06* | (2012.01) |
| *G06Q 30/06* | (2012.01) |
| *G06Q 10/10* | (2012.01) |

(52) U.S. Cl.
CPC .............. *G06Q 10/00* (2013.01); *G06Q 10/06* (2013.01); *G06Q 10/10* (2013.01); *G06Q 30/06* (2013.01)

(58) Field of Classification Search
CPC ......... G06Q 10/00; G06Q 10/06; G06Q 30/06
USPC .................................. 705/7, 8, 9, 26.1, 7.27
See application file for complete search history.

(56) References Cited

U.S. PATENT DOCUMENTS

| | | | |
|---|---|---|---|
| 2008/0140857 A1* | 6/2008 | Conner ................. | G06Q 10/00 709/236 |
| 2009/0138293 A1* | 5/2009 | Lane .................. | G06Q 10/0633 705/7.27 |
| 2009/0158240 A1* | 6/2009 | Zhang ....................... | G06F 8/00 717/104 |
| 2009/0177692 A1* | 7/2009 | Chagoly ............. | G06F 11/0709 |
| 2010/0023919 A1 | 1/2010 | Chaar et al. | |

(Continued)

FOREIGN PATENT DOCUMENTS

EP    1542123    3/2011

OTHER PUBLICATIONS

Srikanth Inaganti, Reuse Framework for SOA, BPTrends Jun. 2007, pp. 1-9.

(Continued)

*Primary Examiner* — Nga B Nguyen
(74) *Attorney, Agent, or Firm* — Schmeiser, Olsen & Watts; John Pivnichny

(57) ABSTRACT

A metrics based design method and system is disclosed. The method includes receiving by a computer processor, an informational model comprising data objects, attributes, and relationships associated with a service. The data objects comprise sub-objects. The computer processor receives business affinity (BA) band data associated with the data objects, threshold levels associated with the business affinity (BA) band data, business affinity (BA) levels associated with the business affinity (BA) band data, and service interface operation parameters. The computer processor computes a business affinity (BA) for the informational model based on the business affinity (BA) band data, the threshold levels, the business affinity (BA) levels, and the service interface operation parameters. The computer processor computes a data variation percentage and a reusability count. The computer processor performs: a nested level computation for service valency, a factorization process for computing service valency, and a data element count.

14 Claims, 11 Drawing Sheets

(56) References Cited

U.S. PATENT DOCUMENTS

| | | | |
|---|---|---|---|
| 2010/0023920 A1 | 1/2010 | Chaar et al. | |
| 2010/0023921 A1 | 1/2010 | Chaar et al. | |
| 2010/0031090 A1 | 2/2010 | Bernardini et al. | |
| 2010/0122238 A1 | 5/2010 | Kannan et al. | |
| 2010/0257009 A1* | 10/2010 | Liu | G05B 19/41875 705/7.22 |
| 2011/0302294 A1* | 12/2011 | Oostlander | G06F 11/302 709/224 |
| 2012/0215582 A1* | 8/2012 | Petri | G06Q 10/0633 705/7.27 |

OTHER PUBLICATIONS

Milanovic et al., Automatic Generation of Service Availability Models, 1939-1374/10 © 2010 IEEE, pp. 1-15.

Jamshidi, et al., An Automated Method for Service Specification, ICSE-WUP'09: The Warm-Up Workshop for ACMIEEE ICSE 2010, Apr. 1-3, 2009, Strand, Cape Town, South Africa, Copyright 2009 ACM 978-1-60558-565-9, pp. 25-28.

* cited by examiner

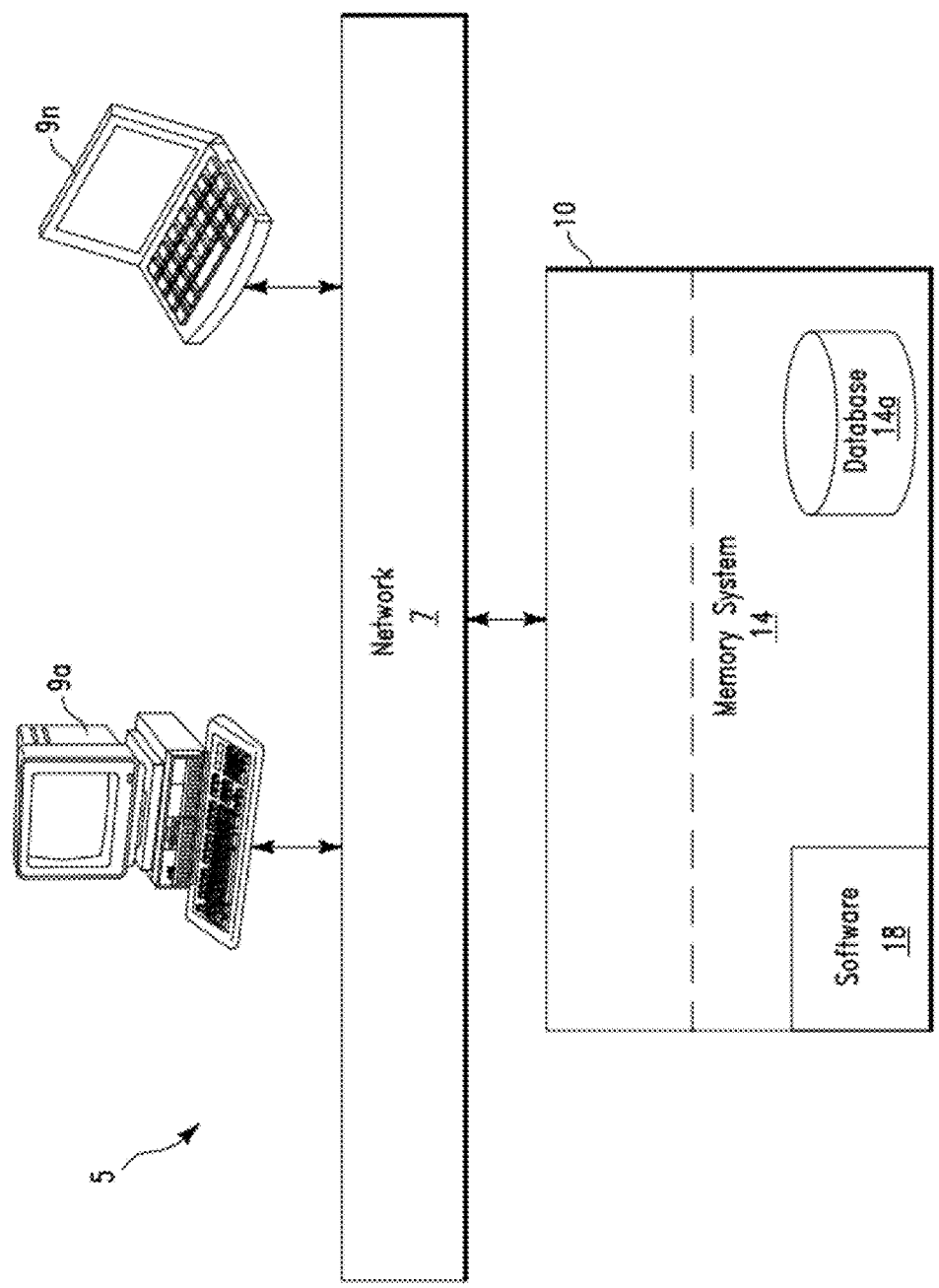

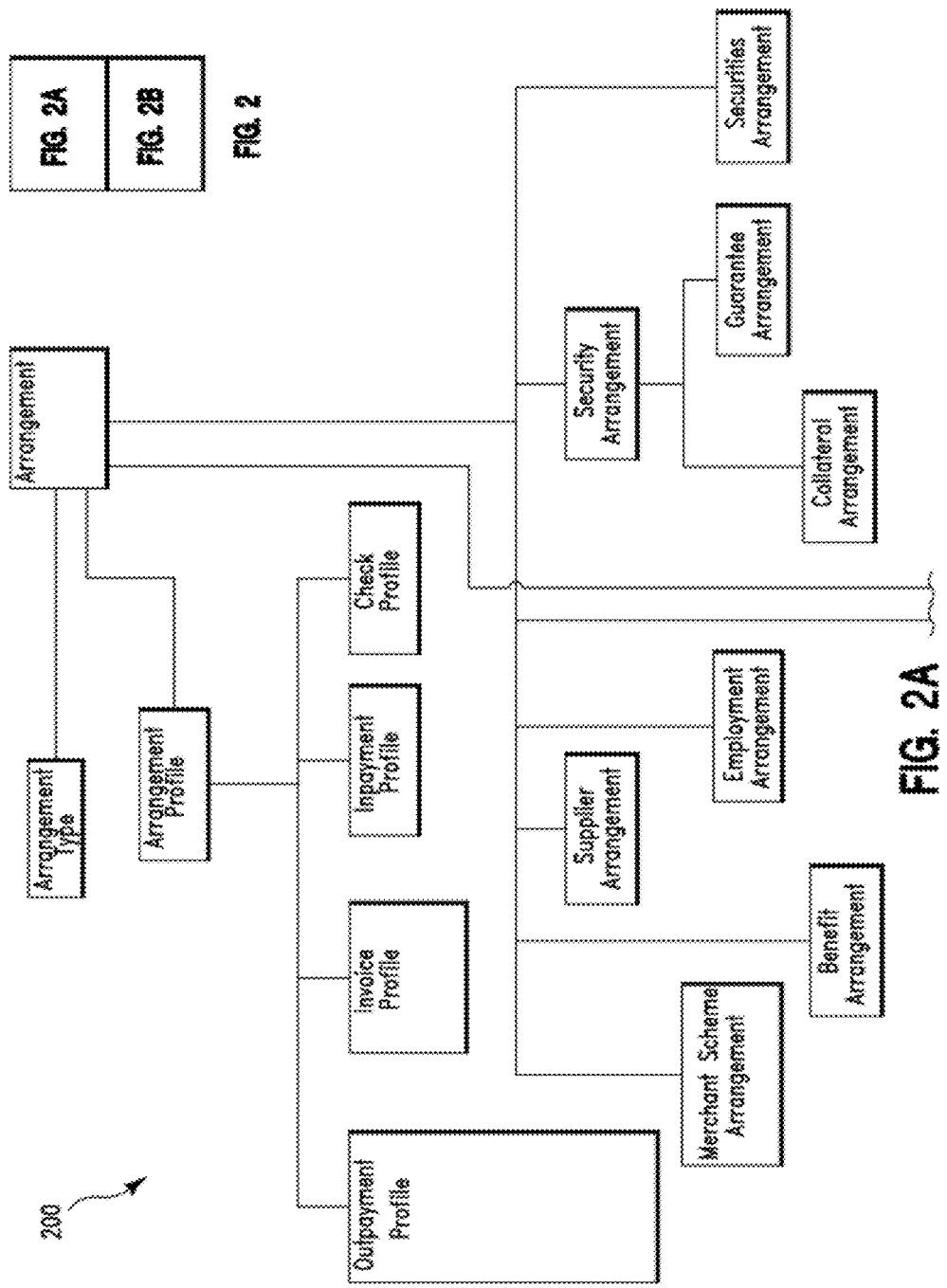

METRICS BASED DESIGN METHOD AND SYSTEM

FIELD OF THE INVENTION

The present invention relates to a method and associated system for generating metrics associated with informational models.

BACKGROUND OF THE INVENTION

Analyzing data typically comprises an inefficient process with little flexibility. Accordingly, there exists a need in the approach to overcome the deficiencies and limitations described herein above.

SUMMARY OF THE INVENTION

The present invention provides a metrics based design method comprising: receiving, by a computer processor of a computing system, an informational model comprising data objects, attributes, and relationships associated with a service associated with a code to fulfill an intended business functionality, wherein the data objects comprise sub-objects; receiving, by the computer processor, business affinity (BA) band data associated with the data objects; receiving, by the computer processor, threshold levels associated with the business affinity (BA) band data; receiving, by the computer processor, business affinity (BA) levels associated with the business affinity (BA) band data and the sub-objects; receiving, by the computer processor, service interface operation parameters; computing, by the computer processor, a business affinity (BA) for the informational model, wherein the computing is based on the business affinity (BA) band data, the threshold levels, the business affinity (BA) levels, and the service interface operation parameters; and generating, by the computer processor, a report indicating recommended sub-objects of the sub-objects. The computer processor computes a data variation percentage and a reusability count. The computer processor performs: a nested level computation for service valency, a factorization process for computing service valency, and a data element count.

The present invention provides a computer program product, comprising a computer readable storage medium having a computer readable program code embodied therein, the computer readable program code comprising an algorithm that when executed by a computer processor of a computing system implements a method comprising: receiving, by the computer processor, an informational model comprising data objects, attributes, and relationships associated with a service associated with a code to fulfill an intended business functionality, wherein the data objects comprise sub-objects; receiving, by the computer processor, business affinity (BA) band data associated with the data objects; receiving, by the computer processor, threshold levels associated with the business affinity (BA) band data; receiving, by the computer processor, business affinity (BA) levels associated with the business affinity (BA) band data and the sub-objects; receiving, by the computer processor, service interface operation parameters; computing, by the computer processor, a business affinity (BA) for the informational model, wherein the computing is based on the business affinity (BA) band data, the threshold levels, the business affinity (BA) levels, and the service interface operation parameters; and generating, by the computer processor, a report indicating recommended sub-objects of the sub-objects. The computer processor computes a data variation percentage and a reusability count. The computer processor performs: a nested level computation for service valency, a factorization process for computing service valency, and a data element count.

The present invention provides a computing system comprising a computer processor coupled to a computer-readable memory unit, the memory unit comprising instructions that when executed by the computer processor implements a method comprising: receiving, by the computer processor, an informational model comprising data objects, attributes, and relationships associated with a service associated with a code to fulfill an intended business functionality, wherein the data objects comprise sub-objects; receiving, by the computer processor, business affinity (BA) band data associated with the data objects; receiving, by the computer processor, threshold levels associated with the business affinity (BA) band data; receiving, by the computer processor, business affinity (BA) levels associated with the business affinity (BA) band data and the sub-objects; receiving, by the computer processor, service interface operation parameters; computing, by the computer processor, a business affinity (BA) for the informational model, wherein the computing is based on the business affinity (BA) band data, the threshold levels, the business affinity (BA) levels, and the service interface operation parameters; and generating, by the computer processor, a report indicating recommended sub-objects of the sub-objects. The computer processor computes a data variation percentage and a reusability count. The computer processor performs: a nested level computation for service valency, a factorization process for computing service valency, and a data element count.

The present invention advantageously provides a simple method and associated system capable of analyzing data.

BRIEF DESCRIPTION OF THE DRAWINGS

FIG. 1 illustrates a system for designing metrics based service specifications, in accordance with embodiments of the present invention.

FIG. 2 including FIGS. 2A and 2B illustrates an implementation example associated with a service oriented architecture (SOA) factory based model outputted by the system of FIG. 1 for designing metrics based service specifications, in accordance with embodiments of the present invention.

DETAILED DESCRIPTION OF THE INVENTION

Figure 2B:
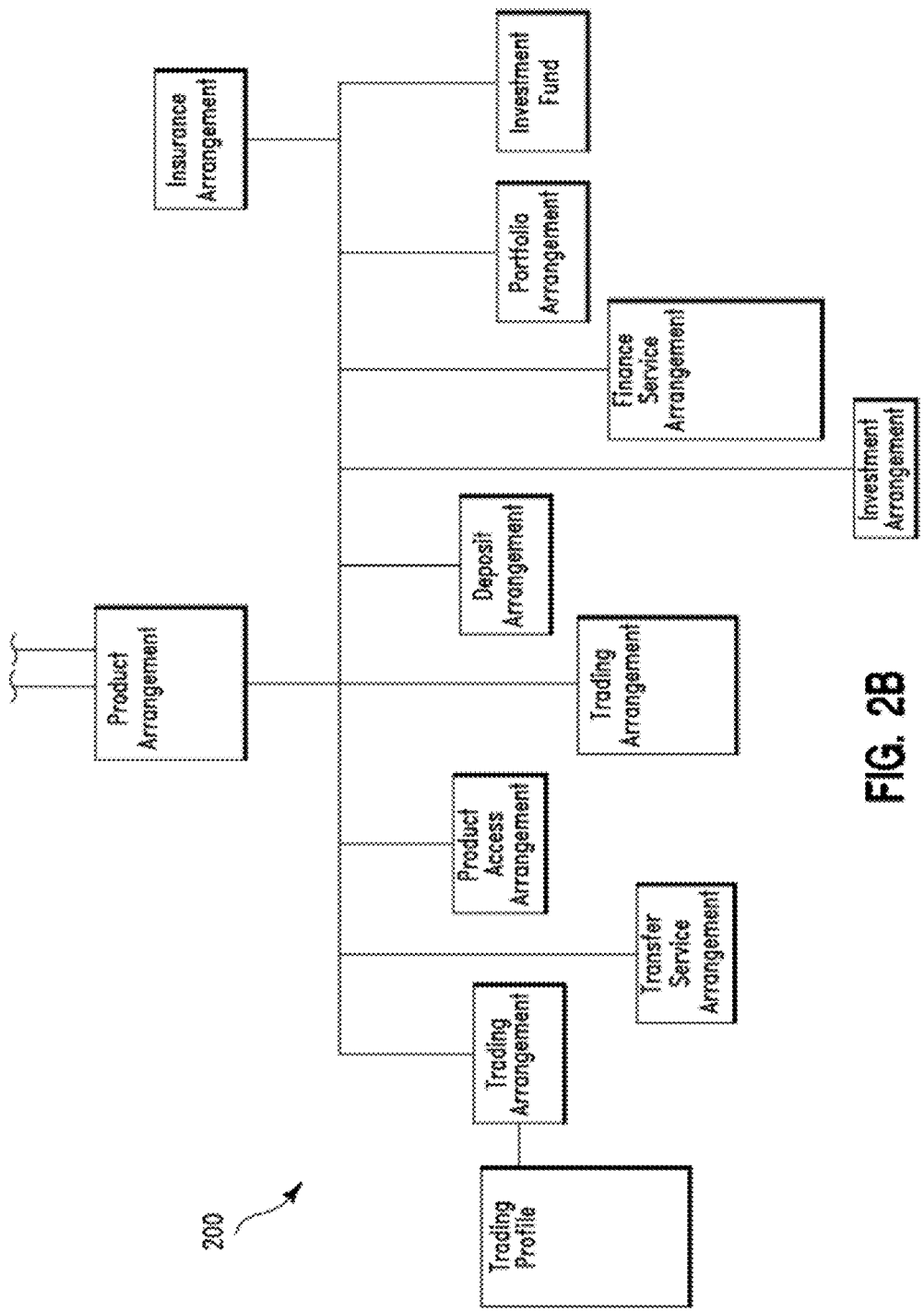

FIG. 1 illustrates a system 5 for designing metrics based service specifications, in accordance with embodiments of the present invention. System 5 comprises software tools enabling generation of service specifications. System 5 generates metrics (during interface formation), compares patterns, and generates reports.

System 5 of FIG. 1 comprises devices 8a . . . 8d connected to a computing system 10 through a network 7. Devices 8a . . . 8d may comprise any type of device including, inter alia, a computer, a notebook computer, a digital assistant, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 comprises a software application 18 and a database 14a. Database 14a may comprise a single database or a plurality of databases. Database 14a may be located internal to computing system 10 (i.e., as illustrated in FIG. 1) or external to computing system 10.

Software application 18 performs the following functions associated with an analysis associated with a metrics based design of service specifications in traditional and factory models:
1. Software application 18 enables a user to perform a "what if" analysis for various patterns of a service interface while analyzing impacts.
2. Software application 18 enables a user to perform an analysis of multiple intra service operations and to identify an impact thereby enabling refinement.
3. Software application 18 generates metrics based reports thereby supporting a software architect to justify design decisions.

Software application allows a designer (e.g., a user) to:
1. Perform a "what if analysis" for various combinations of patterns (i.e., an impact of metrics while the designer increases a boundary of elements and sub-typing, etc).
2. Perform a "what if analysis" from a service granularity perspective for various patterns.
3. Perform an analysis for various formation styles to enable judgment of an impact.
4. Perform an analysis among service operations from various perspectives.
5. Justify design decisions through a metrics based model. Software application comprises the following built in metrics:
A. Reusability.
B. Granularity.
C. Degree of affinity (intra operation).
D. Data level variance (intra operation).
E. Service Valency.

Therefore, software application 18 serves as an analyzer to perform "what if" analysis and observe metrics thereby enabling a trade-off and producing a robust service interface to promote reuse. The characteristics of the resulting interface will be measured and will inherit features to reap benefits of sound architecture (e.g., service oriented architecture (SOA)) in factory and traditional architecture environments.

FIG. 2 including FIGS. 2A and 2B illustrates an implementation example associated with an SOA factory based model 200 implemented by system 5 of FIG. 1 for designing metrics based service specifications, in accordance with embodiments of the present invention. The following description describes an implementation example associated with SOA factory based model 200:

SOA factory based models typically rely on standards for building service components. The standards lead to a very coarse grained service interface. For example, a service "ArrangementManagement" may include a broad range of elements from (for example) "TradingArrangement" to "SecurityArrangement". Each element "TradingArrangement" to "SecurityArrangement" may comprise related elements (i.e., that may or may not have a relationship to the other). An SOA architect may analyze and finalize decisions relating to the following issues associated with an SOA factory based model:
1. The impact of grouping (combing or separating) concrete entities together.
2. Identify the impact changing a service operation data boundary.
3. Reusability as defined by a set of standard patterns.
4. The impact of a chosen service granularity. A designer may analyze a degree of granularity by including/eliminating business processes and related data.
5. The ability for a service operation to fit easily into services of higher abstraction (i.e., service valency). Service valency is defined herein as a quality of a service to fit in easily when being used by higher layer services. A Service valency depends upon the following:
A. The degree of factorization of the service.
B. The nested level of interface data elements.
6. The variation of data elements between interfaces and their ability to generate context driven service operations.

The SOA factory based model 200 comprises the following example group of data elements used when designing a service for SOA: Arrangement, ArrangementType, ArrangementProfile, OutpaymentProfile, InvoiceProfile, InpaymentProfile, CheckProfile, MerchantSchemeArrangement, BenefitArrangement, SupplierArrangement, EmploymentArrangement, SecurityArrangement, CollateralArrangement, GuaranteeArrangement, SecuritiesArrangement, ProductArrangement, InsuranceArrangement, TradingProfile, TradingArrangement, TransferServiceArrangement, ProductAccessArrangement, TradingArrangement, DepositArrangement, InvestmentArrangement, FinanceServiceArrangement, PortfolioArrangement, and InvestmentFund.

Figure 3:
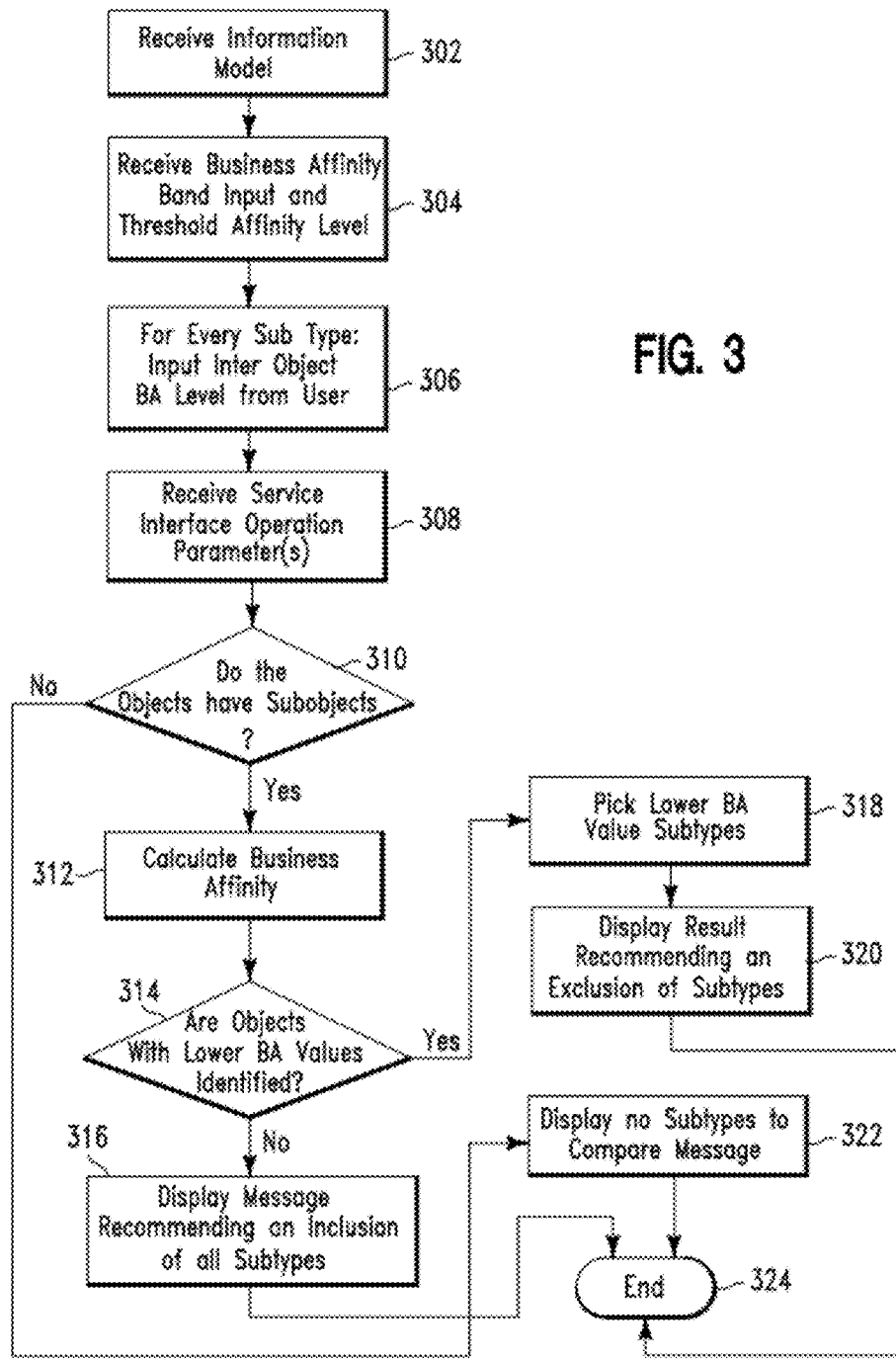
FIG. 3 illustrates an algorithm used by the system of FIG. 1 for implementing a business affinity analysis process, in accordance with embodiments of the present invention.

FIG. 3 illustrates an algorithm used by system 5 of FIG. 1 for implementing a business affinity analysis process, in accordance with embodiments of the present invention. The algorithm of FIG. 3 is used to compute a grouping of objects with strong business affinity when designing a service interface. Table 1 is used to determine a business affinity (BA) level for subtype objects.

TABLE 1

| | Affinity to A1 | Affinity to B1 | Affinity to C1 | Affinity to D1 |
|---|---|---|---|---|
| A1 | — | 0 | 1 | 3 |
| B1 | — | — | 2 | 2 |
| C1 | — | — | — | 34 |
| D1 | — | — | — | — |

For example if type ProductArrangement comprises subtypes: TradingArrangement, DepositArrangement, InvestmentArrangement, etc; an affinity between TradingArrangement to DepositArrangement may be 0 while TradingArrangement may have a business affinity (BA) of 2 to InvestmentArrangement. Business affinity (BA) may be defined as the semantic cohesion among sub-objects. The algorithm of FIG. 3 comprises a precursor phase (i.e., steps 302-306) and an execution phase (i.e., steps 308-324).
Precursor Phase During the precursor phase, a designer inputs an informational model (e.g., industry published and/or defined by an enterprise). The informational model serves as a basis for defining service data elements. For each sub-object (i.e., subtype), a business affinity (BA) level (in comparison to the other sub-objects) is received. Additionally, a computing system (e.g., computing system 10 of FIG. 1) enables a user to select a threshold affinity level. A threshold affinity level is defined herein as a minimum affinity value allowed between subtypes when those subtypes are grouped. The threshold affinity level allows groupings of subtypes with more than a minimum level of business affinity (BA) in a service. Note that a threshold affinity level differs from a band (i.e., a threshold is a single number expressing a single limit). For example, a threshold affinity level may be used by a computing system to output subtypes comprising a greater affinity.

In step 302, a computer processor (i.e., of a computing system such as, inter alia, computing system 10 of FIG. 1) receives an informational model comprising data objects, attributes, and relationships associated with a service. In step 304, the computer processor receives business affinity (BA) bands and threshold affinity levels associated with the informational model. In step 306 (for every subtype), an inter object business affinity (BA) level is received from a user.
Execution Phase During the execution phase, the computing system captures definitions of service interface elements and determines if the objects comprise sub-types. For each subtype, a business affinity (BA) is computed based on a selected threshold affinity level by comparing with other subtypes. Sub types with lesser affinity are selected and recommended to be removed from an interface. If all the business affinity (BA) levels are greater than or equal to set threshold values, the computing system may display a message recommending an inclusion all subtypes. If no subtypes are available, the computing system may display a message indicating that there are no subtypes to compare.

In step 308, the computer processor receives service interface operation parameters. In step 310, it is determined if the data objects comprise sub-objects. If in step 310, it is determined that the data objects do not comprise sub-objects then in step 322, the computer processor displays a no sub-objects message and the process is terminated in step 324. If in step 310, it is determined that the data objects do comprise sub-objects then in step 312, the computer processor calculates a business affinity (BA) for the informational model. The calculation is based on the business affinity (BA) bands, the threshold affinity levels, business affinity (BA) levels, and service interface operation parameters. In step 314, it is determined if data objects with lower business affinity (BA) levels are identified. If in step 314, it is determined that data objects with lower business affinity (BA) levels are not identified then in step 316, a message indicating a recommendation for an inclusion of all sub-objects is displayed and the process is terminated in step 324. If in step 314, it is determined that data objects with lower business affinity (BA) levels are identified then in step 318, the computer processor selects business affinity (BA) values associated with lower sub-objects. In step 320, a message indicating a recommendation for an exclusion (or replacement) of all sub-objects is displayed and the process is terminated in step 324.

Figure 4:
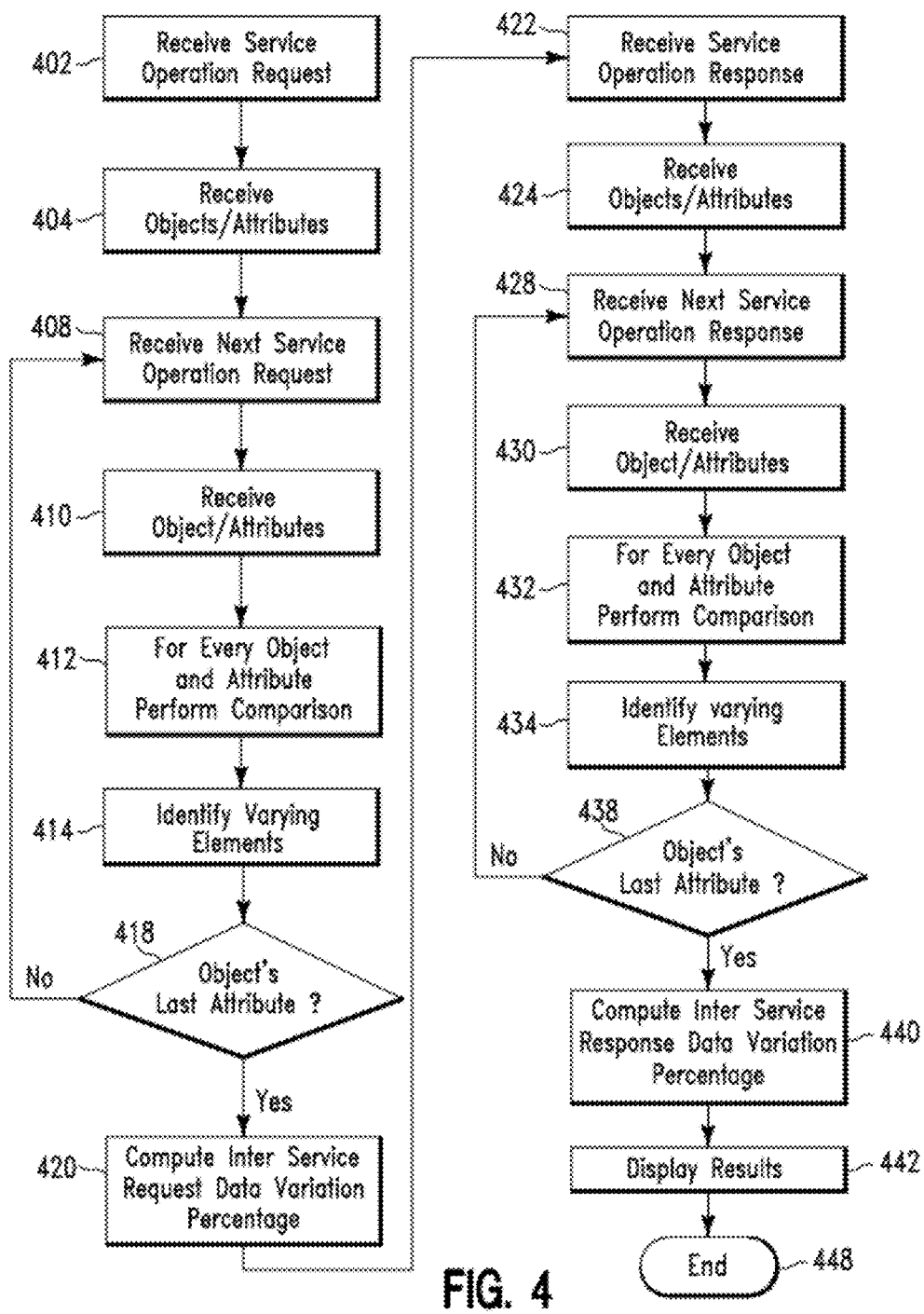
FIG. 4 illustrates an algorithm used by the system of FIG. 1 for computing a data variation percentage associated with a service operation request, in accordance with embodiments of the present invention.

FIG. 4 illustrates an algorithm used by system 5 of FIG. 1 for computing a data variation percentage associated with a number of service operation requests, in accordance with embodiments of the present invention. An intra service operation variation computation enables a designer to make decisions to combine operations together rather than deciding to manifest them separately. For example, consider a service "AppointmentManagement" with an operation "CreateAppointmentRequest" and "CreateAppointmentResponse"/ "RetrieveApppointmentRequest and ModifyAppointmentResponse. If attributes handled by the operations are the same (rather than manifesting them as separate operations), they may be combined into a single operation "FulfillAppointmentRequest and response. Additionally, the attributes may include a flag "Context=C, R" to drive a behavior of an interface for performing create or retrieve operations. This system enables a designer to perform operation consolidation decisions based on a data variation count.

In step 402, the computer processor receives a service operation request associated with a service. In step 404, the computer processor receives associated (i.e., associated with the service operation request received in step 402) data objects and attributes. In step 408, the computer processor receives a next service operation request associated with the service. In step 410, the computer processor receives associated (i.e., associated with the next service operation request received in step 408) data objects and attributes. In step 412, a comparison process is performed for every object and attribute. In step 414, varying elements are identified. In step 418, the computer processor determines if each data object has been associated with a last attribute. If in step 418, the computer processor determines that a data object has not been associated with a last attribute then step 408 is repeated. If in step 418, the computer processor determines that a data object has been associated with a last attribute then in step 420, the computer processor computes an inter service request data variation percentage associated with the service operation request. In step 422, the computer processor receives a service operation response associated with the service operation request. In step 424, the computer processor receives associated (i.e., associated with the service operation response received in step 422) data objects and attributes. In step 428, the computer processor receives a next service operation request associated with the service operation response received in step 422. In step 430, the computer processor receives associated (i.e., associated with the next service operation request received in step 428) data objects and attributes. In step 432, the computer processor compares each received data object to received attributes and in step 434, varying elements are identified. In step 438, the computer processor determines if a data attribute of (i.e., a last attribute of a last data object) has been associated with a last attribute. If in step 438, the computer processor determines that the data attribute has not been associated with the last attribute then step 428 is repeated. If in step 438, the computer processor determines that the data attribute has been associated with the last attribute then in step 440, the computer processor computes an inter service data variation percentage associated with the service operation responses. In step 442, the computer processor displays results of all calculations and the process terminates is step 448.

Figure 5:
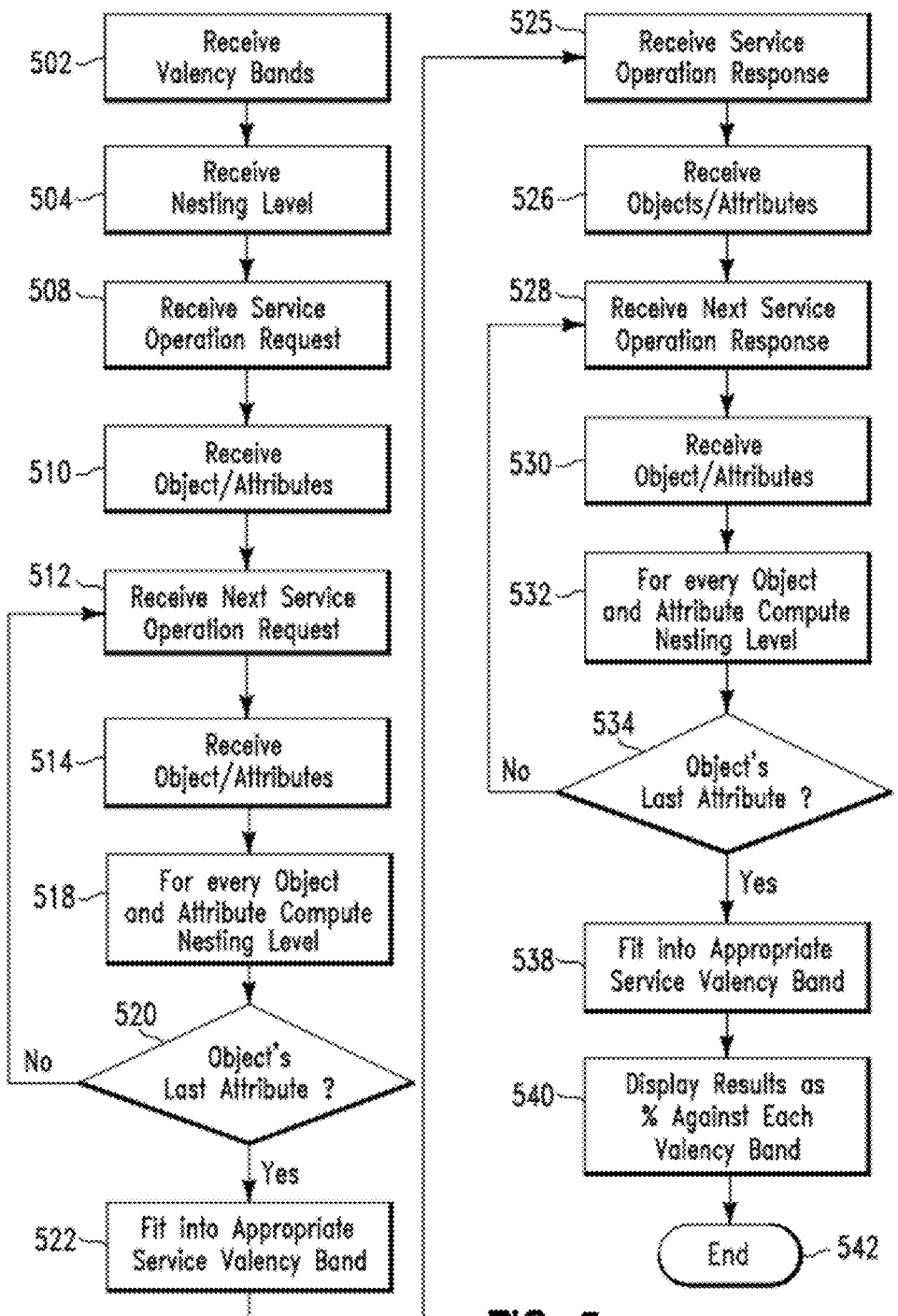
FIG. 5 illustrates an algorithm used by the system of FIG. 1 for computing service valency bands, in accordance with embodiments of the present invention.

FIG. 5 illustrates an algorithm used by system 5 of FIG. 1 for computing a service valency, in accordance with embodiments of the present invention. Service valency measures the quality of a service to be able to be readily used by higher layer services. Service valency depends upon the following:
1. A nested level of interface data elements.
2. A degree of factorization of a service.

A nested level defines the number of levels which a designer requires to traverse for retrieving a desired data element. For example, a service "OrderManagement" comprising a nested set of objects: ProductArrangement/PostalAddress/StructuredPostalAddress/ContactPreference/TimeFrame/StartDate may require a retrieved date. In order to retrieve the date, a designer may need to traverse across an entire path starting from ProductArrangement. This path from ProductArrangement to TimeFrame comprises a nested level of depth 5. The lower the nested level, the easier the service fits into another composite service (or easy to consume) which will be assessed by the system. During a precursor phase, the system enables a user to assign a nesting level to bands. For example, a nesting level: a depth of 1, 2, or 3 might be assigned band low, a depth of 4, 5, or 6 might be band for medium, and 7 or greater depth might be assigned a band of high as defined by the user. In an execution phase, the system may receive a service interface and compute valency bands.

In step 502, the computer processor receives valency bands. In step 504, the computer processor receives nesting levels associated with the valency bands. In step 508, the computer processor receives a service operation request associated with a service. In step 510, the computer processor receives associated (i.e., associated with the service operation request received in step 508) data objects and attributes. In step 512, the computer processor may receive a next service operation request associated with the service. In step 514, the computer processor receives associated (i.e., associated with the next service operation request received in step 512) data objects and attributes. In step 518, the computer processor computes a nesting level for the data objects and attributes. In step 520, the computer processor determines if a data attribute (i.e., a last attribute of a last data object) has been associated with a last attribute. If in step 520, the computer processor determines that the data attribute has not been associated with a last attribute then step 512 is repeated. If in step 520, the computer processor determines that data attribute has been associated with a last attribute then in step 522, the computer processor fits the nesting levels into associated valency bands. In step 525, the computer processor receives a service operation response associated with the service operation request. In step 526, the computer processor receives associated (i.e., associated with the service operation response received in step 525) data objects and attributes. In step 528, the computer processor receives a next service operation response associated with the service operation response received in step 524. In step 530, the computer processor receives associated (i.e., associated with the next service operation request received in step 528) data objects and attributes. In step 532, the computer processor computes a nesting level for the data objects and attributes. In step 534, the computer processor determines if a data attribute (i.e., a last attribute of a last data object) has been associated with a last attribute. If in step 534, the computer processor determines that the data attribute has not been associated with a last attribute then step 528 is repeated. If in step 534, the computer processor determines that the data attribute has been associated with a last attribute then in step 538, the computer processor fits the nesting levels into associated valency bands. In step 540, the computer processor displays results as a percentage against each valency band and the process terminates is step 542.

Figure 6:
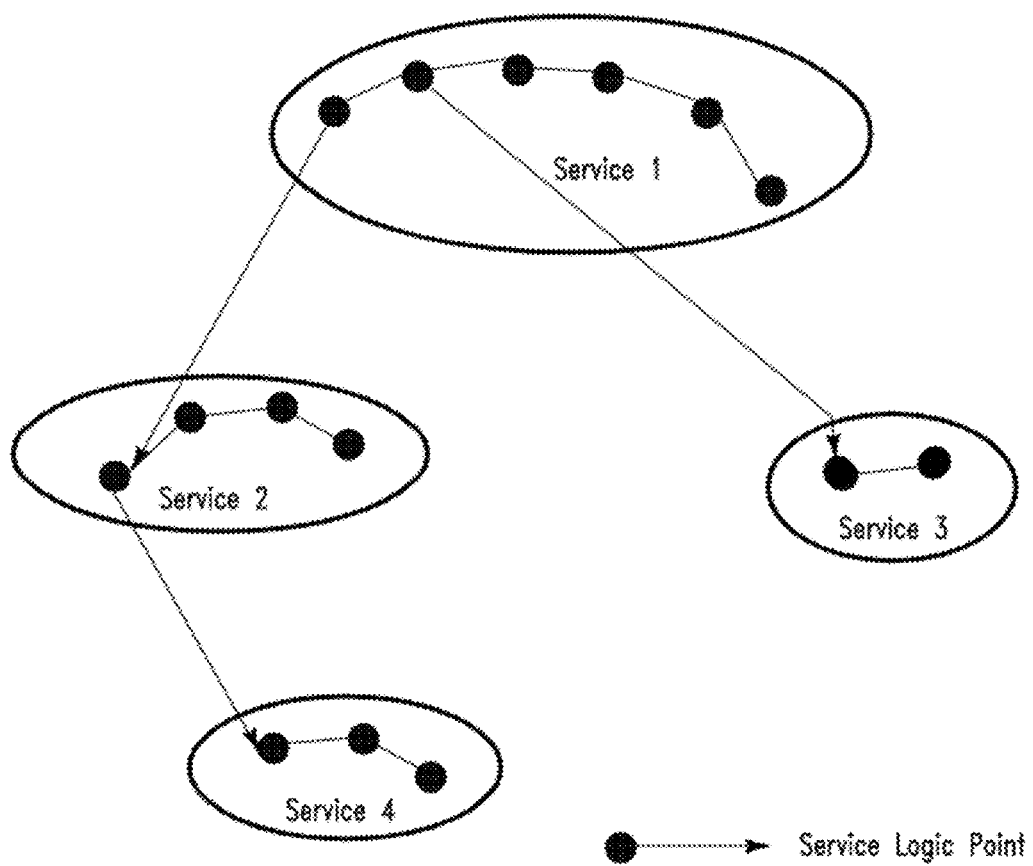
FIG. 6 illustrates an example of a service hierarchy that may be subject to a factorization process, in accordance with embodiments of the present invention.

FIG. 6 illustrates an example of a service hierarchy that may be subject to a factorization process, in accordance with embodiments of the present invention. In FIG. 6, each of the ellipses represents a service and each of the shaded circles represents a service logic point. In the example illustrated in FIG. 6, service 1 and service 2 comprise composite services. A composite service is defined herein as a service that uses other services internally to fulfill intended business functionality. Service 3 and service 4 comprise atomic services. An atomic service does not use any service internally. The feature "atomicity of a service" is related to the concept of domains. Domains comprise abstract boundaries for grouping services. For example, a domain could comprise a customer domain, a resource domain, an agreement domain, an event domain, a service domain, etc. Aggregates comprise a constellation or group of objects pertaining to a single domain. For example, CustomerSLA, CustomerBilling, ResourceFulfillment, etc comprise aggregates residing within an appropriate domain. If the service logic includes elements from different domains, there is a need to factorize.

Figure 7:
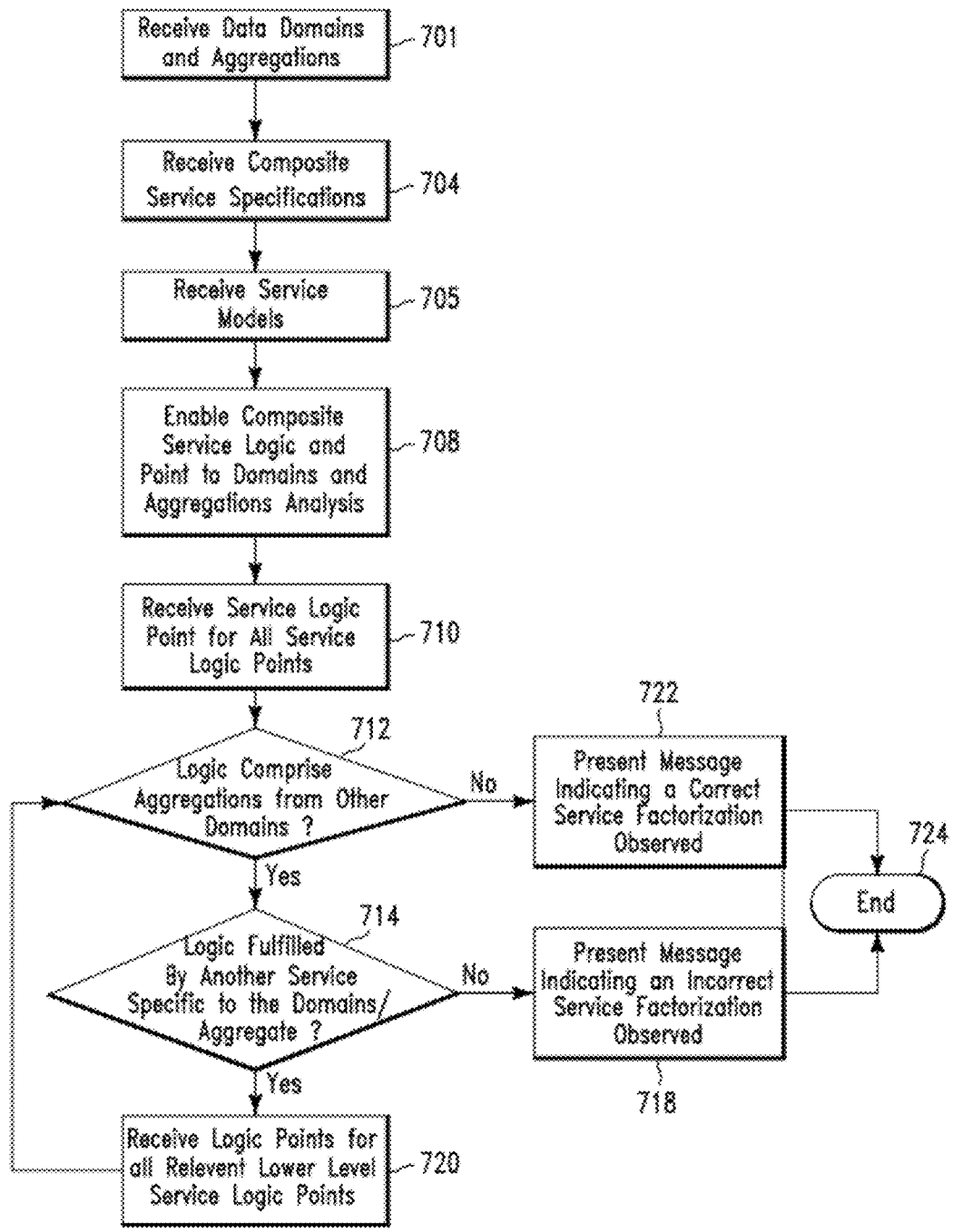
FIG. 7 illustrates an algorithm used by the system of FIG. 1 for performing a service factorization degree analysis for computing valency, in accordance with embodiments of the present invention.

FIG. 7 illustrates an algorithm used by system 5 of FIG. 1 for performing a service factorization degree analysis for computing valency, in accordance with embodiments of the present invention. A service factorization level is defined as an atomicity degree of a function involving elements from relevant domains only. A service may be treated to be atomic when its functionality cannot be factored anymore. For example, a service termed OrderManagement comprises an intended functionality to fulfill an order. This service may include elements such as: CustomerNamedetails, Contact details, Productdetails, Addressdetails, etc. This service may additionally include logic to check an address and check products and fulfill the order. If a designer designs a service for performing an entire functionality, then the service is not factored. When designing services, the functionality needs to be factored properly aligning with elements in an appropriate domain. Therefore, factored services will fit into any appropriate composite service. The service factorization level is computed by the system.

In step 701, the computer processor receives data domains and aggregations associated with a service operation request. In step 704, the computer processor receives composite service specifications associated with the data domains and the aggregations. In step 705, the computer processor receives service models associated with the informational model of the algorithm of FIG. 3. In step 708, the computer processor enables a composite service logic and points to data domains and aggregations analysis. In step 710, the computer processor receives a service logic point and repeats all subsequent steps for all service logic points. Step 710 is repeated until top logic points are exhausted. In step 712, the computer processor determines if the service logic comprises aggregations from other domains.

If in step 712, the computer processor determines that the service logic comprises aggregations from other domains then in step 714, the computer processor determines if the service logic is fulfilled by another service specific to the domain/aggregate. If in step 714, the computer processor determines that the service logic is fulfilled by another service specific to the domain/aggregate then in step 720, the computer processor receives (i.e., for all relevant lower service logic points) logic points and step 712 is repeated. If in step 714, the computer processor determines that the service logic is not fulfilled by another service specific to the domain/aggregate then in step 718, a message indicating an incorrect service factorization is presented and process is terminated in step 724.

If in step 712, the computer processor determines that the service logic does not comprise aggregations from other domains then in step 722, a message indicating a correct service factorization is presented and process is terminated in step 724.

Figure 8:
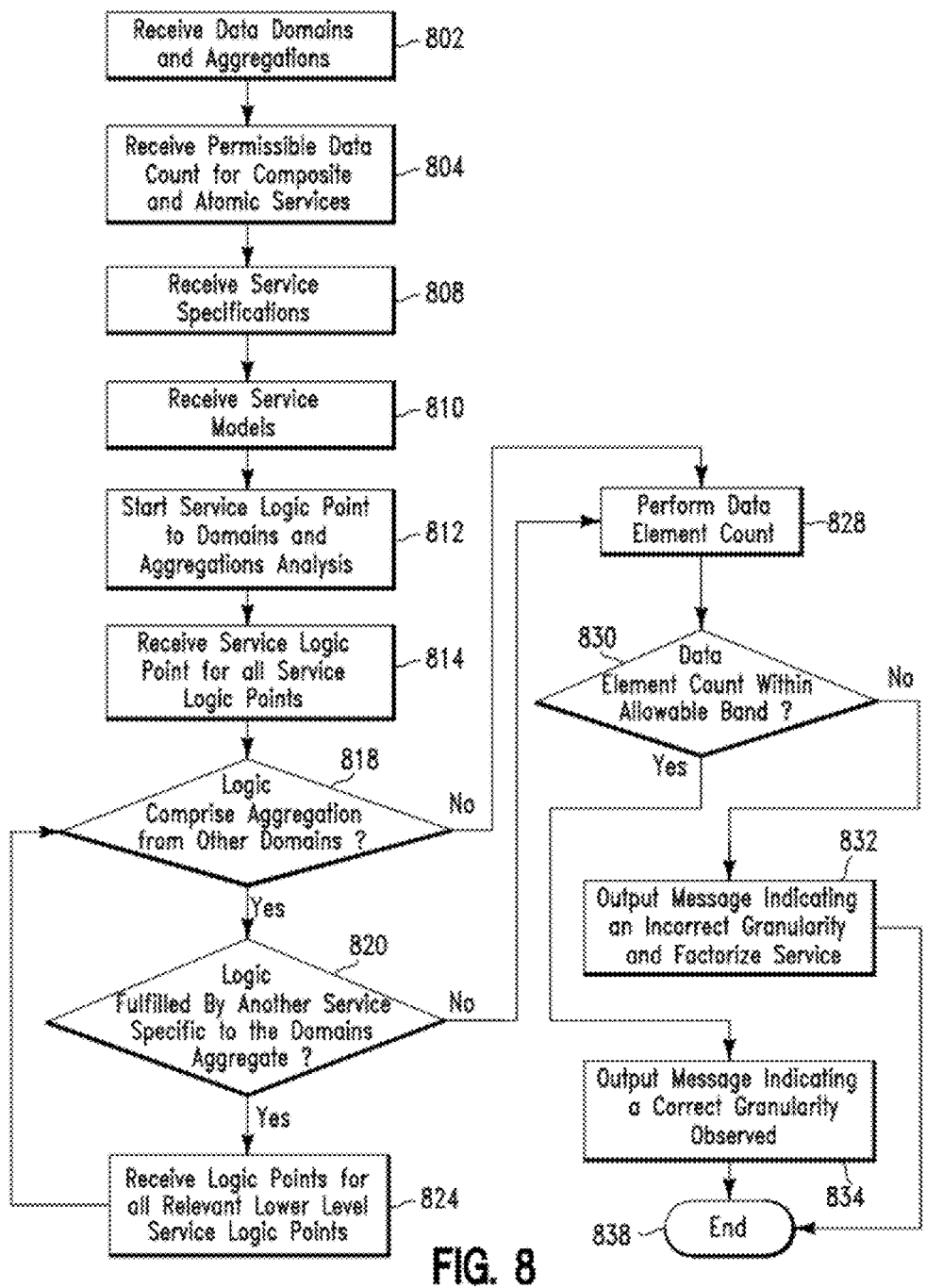
FIG. 8 illustrates an algorithm used by the system of FIG. 1 for performing a data element count and/or breadth of function, in accordance with embodiments of the present invention.

FIG. 8 illustrates an algorithm used by system 5 of FIG. 1 for performing a service data element count, in accordance with embodiments of the present invention. A service data count is defined herein as a count of data elements manifested in a service interface. For example, a service interface may comprise data elements involving service logics which may require elements from other boundaries for data elements. A designer may factorize a service based upon a count. In a pre-cursor phase, the system receives domains/aggregations manually or through imports. The system additionally imports permissible data counts on a service interface for atomic and composite service categories.

In step 802, the computer processor receives data domains and aggregations associated with a service operation request. In step 804, the computer processor receives permissible data counts for composite and atomic services. In step 808, the computer processor receives composite service specifications associated with the data domains and the aggregations. In step 810, the computer processor receives service models associated with the informational model of the algorithm of FIG. 3. In step 812, the computer processor starts service logic point to domain and aggregation analysis. In step 814, the computer processor receives (i.e., for all service logic points) a service logic point. In step 818, the computer processor determines if the service logic comprises aggregations from other domains (i.e., data elements belonging to other domains).

If in step 818, the computer processor determines that the service logic comprises aggregations from other domains then in step 820, the computer processor determines if the service logic is fulfilled by another service specific to the domain/aggregate. If in step 820, the computer processor determines that the service logic is fulfilled by another service specific to the domain/aggregate then in step 824 (for all relevant lower level service logic points), the computer processor receives logic points and step 818 is repeated. If in step 820, the computer processor determines that the service logic is not fulfilled by another service specific to the domain/aggregate then step 828 is executed as described, infra.

If in step 818, the computer processor determines that the service logic does not comprise aggregations from other domains then in step 828, the computer processor performs a data element count. In step 830, the computer processor determines if the data element count is within allowable valency bands. If in step 830, the computer processor determines that the data element count is within allowable valency bands then in step 834, the computer processor displays a message indicating that a correct granularity is observed and the process is terminated in step 838. If in step 830, the computer processor determines that the data element count is not within allowable valency bands then in step 832, the computer processor displays a message indicating that an incorrect granularity is observed (and to factorize the service) and the process is terminated in step 838.

Figure 9:
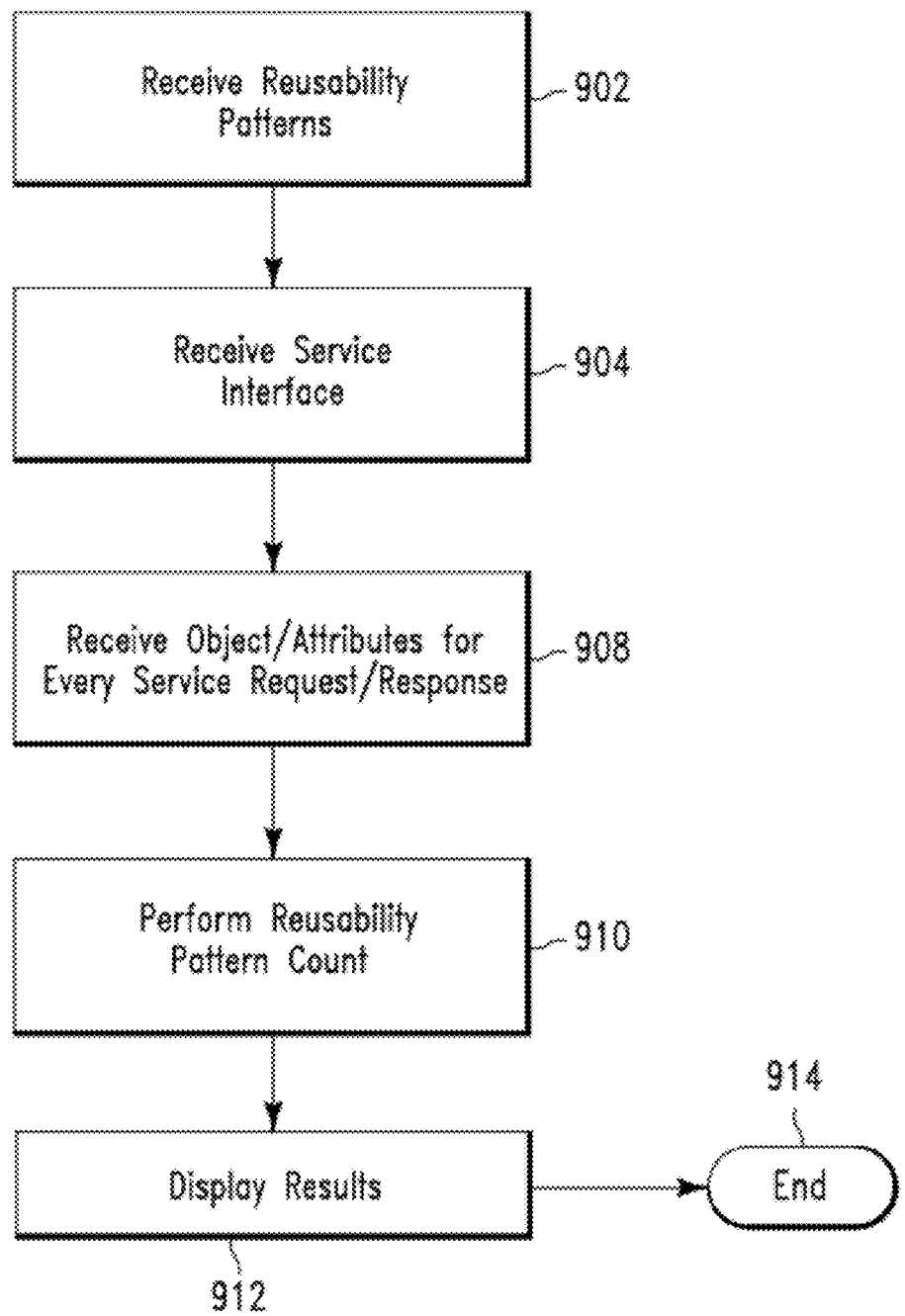
FIG. 9 illustrates an algorithm used by the system of FIG. 1 for computing a reusability count, in accordance with embodiments of the present invention.

FIG. 9 illustrates an algorithm used by system 5 of FIG. 1 for computing a reusability count, in accordance with embodiments of the present invention. Reusability may be achieved by fitting appropriate pattern(s) into a service interface. A reusability count is defined herein as a number of appropriate pattern(s) on a service interface. A reusability count may include categories such as, inter alia, name value pairs, self recursive patterns, etc. In step 902, the computer processor receives reusability patterns associated with a service operation request. In step 904, the computer processor receives a service interface associated with the service operation request. In step 908, the computer processor receives a group of data objects and associated attributes associated with every service operation request. In step 910, the computer processor performs a reusability pattern count for the reusability patterns. In step 912, the computer processor presents (to a user) results of the reusability pattern count.

Figure 10:
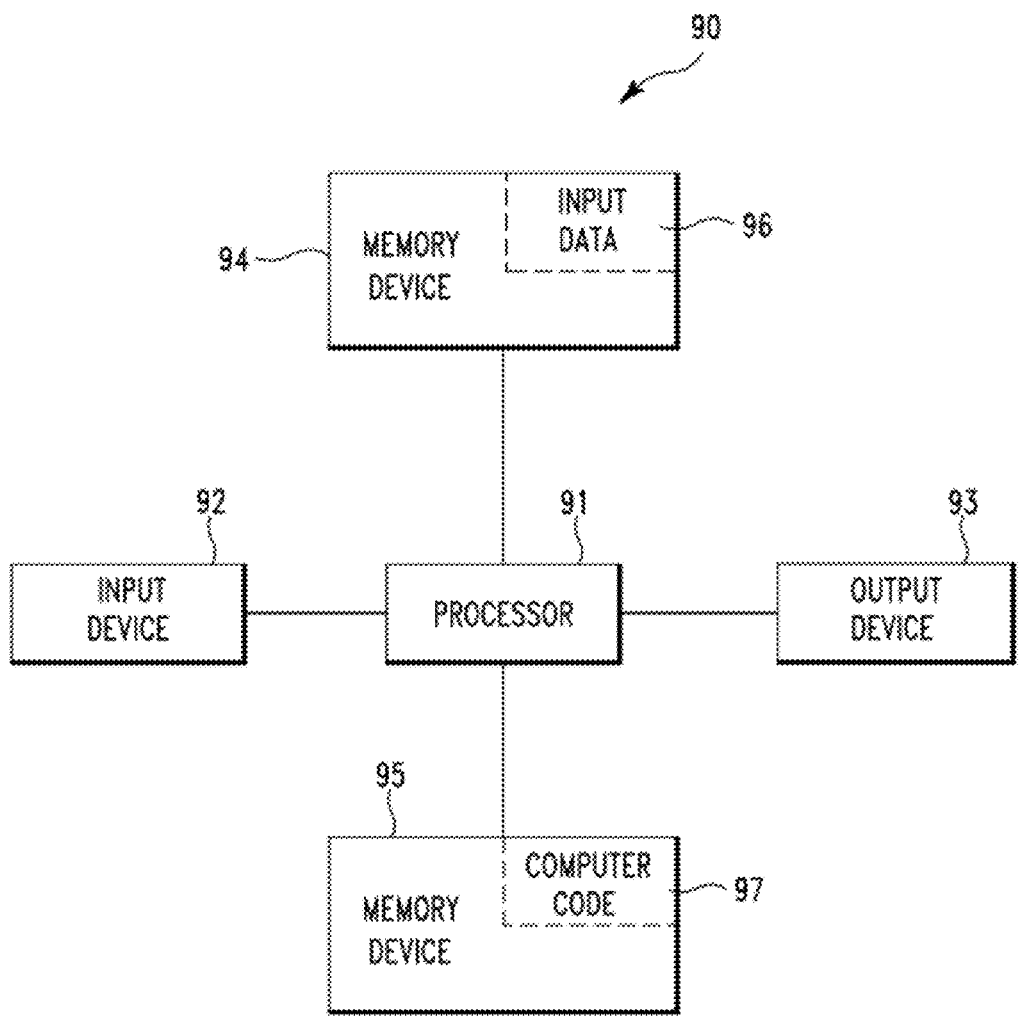
FIG. 10 illustrates a computer apparatus used for designing metrics based service specifications, in accordance with embodiments of the present invention.

FIG. 10 illustrates a computer apparatus 90 (e.g., computing system 10 of FIG. 1) used for designing metrics based service specifications, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-9) for designing metrics based service specifications. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithms of FIGS. 3-9 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to design metrics based service specifications. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for designing metrics based service specifications. In another embodiment, the invention provides a method that performs the process steps of the invention on a subscription, advertising, and/or fee basis. That is, a service provider, such as a Solution Integrator, could offer to design metrics based service specifications. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A metrics based design interface improvement method comprising:
  receiving within a plurality of internal and external databases, via an input device and a network, by a computer processor of a plurality of database computing systems each comprising a particular configuration of hardware comprising said plurality of internal and external databases, an informational model comprising data objects, attributes, and relationships associated with a service, wherein said data objects comprise sub-objects;
  receiving, by said computer processor, business affinity (BA) band data associated with said data objects;
  receiving, by said computer processor, threshold levels associated with said business affinity (BA) band data;
  receiving, by said computer processor, business affinity (BA) levels associated with said business affinity (BA) band data and said sub-objects, wherein said receiving said business affinity (BA) levels comprises receiving a table comprising said business affinity (BA) levels, wherein said table comprises a plurality of rows and a plurality of columns intersecting said plurality of rows to define said business affinity (BA) levels, and wherein said table enables storage of (BA) levels thereby providing a sematic cohesion between sub-objects;
  receiving, by said computer processor, service interface operation parameters;
  computing, by said computer processor, a business affinity (BA) for said informational model, wherein said computing is based on said business affinity (BA) band data, said threshold levels, said business affinity (BA) levels, and said service interface operation parameters;
  generating, by said computer processor, a report indicating recommended sub-objects of said sub-objects;
  presenting, by said computing system via a plotter of said plurality of database computing systems, said report;
  receiving, by said computer processor, reusability patterns associated with a service operation request for generating service components for a service oriented architecture (SOA) and a service operation response;
  building, by said computer processor based on said reusability patterns, said service components;
  generating, by said computer processor enabling an analyzer component, a service interface associated with said service interface operation parameters, said service operation request, and said service operation response, said service interface comprising a hardware and software component;
  deploying said service interface such that said SOA is interfaced, via said network, to said plurality of database computing systems;
  measuring by said computer processor, characteristics of said service interface;
  fitting, by said computer processor enabling said analyzer component, said reusability patterns within said service interface;
  generating, by said computer processor, said service components within said SOA;
  removing, by said computer processor based on said business affinity (BA) levels of said table, at least one sub object of said sub-objects;
  improving, by said computer processor based on results of said measuring, said removing, said building, and said fitting, said service components of said SOA and said service interface with respect to computer architecture of a factory;
  receiving, by said computer processor, valency bands;
  generating a software application comprising said valency bands and said reusability patterns built into said software application;
  receiving, by said computer processor, nesting levels associated with said valency bands,
  receiving, by said computer processor, a service operation request associated with said service and said valency bands;
  retrieving, by said computer processor, a group of said data objects and associated attributes of said attributes;
  computing, by said computer processor, nesting levels for said group of said data objects and said associated attributes;
  associating, by said computer processor, said associated attributes with said valency bands;
  computing, by said computer processor based on results of said associating, a valency variation percentage associated with each of said valency bands;
  presenting, by said computer processor to a user, said valency variation percentage;
  receiving, by said computer processor, a service operation request associated with said service;
  comparing, by said computer processor, said service operation request to said report;
  retrieving, by said computer processor based on results of said comparing said service operation request to said report, a group of said data objects and associated attributes of said attributes;
  comparing, by said computer processor, each data object of said group of said data objects to said associated attributes;
  identifying, by said computer processor based on results of said comparing each data object, varying elements associated with said group of said data objects and said associated attributes;
  computing, by said computer processor based on results of said identifying, a data variation percentage associated with said service operation request;
  displaying, by said computer processor via a computer screen to a user, said data variation percentage;
  receiving, by said computer processor from said user via said input device, responses associated with said data variation percentage;
  computing, by said computer processor based on said responses, a response data variation percentage;
  displaying, by said computer processor via said computer screen to said user, said response data variation percentage; and combining, based on execution of said software application, said service interface with said service components within said SOA such that a hardware and software architectural system is generated.

2. The method of claim 1, further comprising:
receiving, by said computer processor, data domains and aggregations associated with a service operation request and a service operation response;
receiving, by said computer processor, composite service specifications associated with said data domains and said aggregations;
receiving, by said computer processor, service models associated with said informational model;
analyzing, by said computer processor, said data domains and said aggregations with respect to said composite service specifications and said service models;
determining, by said computer processor, that a group of said aggregations is associated with multiple domains of said data domains; and
generating, by said computer processor, a message indicating a status of service factorization associated with results of said determining.

3. The method of claim 1, further comprising:
receiving, by said computer processor, data domains and aggregations associated with a service operation request and a service operation response;
receiving, by said computer processor, a permissible data count associated with said data domains and said aggregations;
receiving, by said computer processor, service specifications associated with said data domains and said aggregations;
receiving, by said computer processor, service models associated with said informational model;
analyzing, by said computer processor, said data domains and said aggregations with respect to said service specifications and said service models;
determining, by said computer processor, that a group of said aggregations is associated with multiple domains of said data domains;
determining, by said computer processor, that said group of said aggregations is associated with an additional service associated with multiple domains of said data domains;
performing, by said computer processor, a data element count for said group of said aggregations;
determining, by said computer processor, if said data element count is within an allowable band; and
generating, by said computer processor based on result of said determining if said data element count is within an allowable band, a message indicating if said data element count is within an allowable band.

4. The method of claim 1, further comprising:
retrieving, by said computer processor, a group of said data objects and associated attributes of said attributes associated with said service operation request and said service operation response;
performing, by said computer processor, a reusability pattern count for said reusability patterns; and
presenting, by said computer processor to a user, results of said reusability pattern count.

5. The method of claim 1, further comprising:
providing at least one support service for at least one of creating, integrating, hosting, maintaining, and deploying computer-readable code in said computing system, wherein the code in combination with the computing system is capable of performing: said receiving said informational model, said receiving said business affinity (BA) band data, said receiving said threshold levels, said receiving said business affinity (BA) levels, said receiving said service interface operation parameters, said computing, and said generating.

6. A computer program product, comprising a computer readable storage medium having a computer readable program code embodied therein, said computer readable program code comprising an algorithm that when executed by a computer processor of a plurality of database computing systems comprising a plurality of internal and external databases implements an interface improvement method comprising:
receiving within said plurality of internal and external databases via an input device and a network, by said computer processor, an informational model comprising data objects, attributes, and relationships associated with a service, wherein said data objects comprise sub-objects, and wherein each of said plurality of database computing systems comprises a particular configuration of hardware comprising said plurality of internal and external databases;
receiving, by said computer processor, business affinity (BA) band data associated with said data objects;
receiving, by said computer processor, threshold levels associated with said business affinity (BA) band data;
receiving, by said computer processor, business affinity (BA) levels associated with said business affinity (BA) band data and said sub-objects, wherein said receiving said business affinity (BA) levels comprises receiving a table comprising said business affinity (BA) levels, wherein said table comprises a plurality of rows and a plurality of columns intersecting said plurality of rows to define said business affinity (BA) levels, and wherein said table enables storage of (BA) levels thereby providing a sematic cohesion between said sub-objects;
receiving, by said computer processor, service interface operation parameters;
computing, by said computer processor, a business affinity (BA) for said informational model, wherein said computing is based on said business affinity (BA) band data, said threshold levels, said business affinity (BA) levels, and said service interface operation parameters;
generating, by said computer processor, a report indicating recommended sub-objects of said sub-objects;
presenting, by said computing system via a plotter of said plurality of database computing systems, said report;
receiving, by said computer processor, reusability patterns associated with a service operation request for generating service components for a service oriented architecture (SOA) and a service operation response;
building, by said computer processor based on said reusability patterns, said service components;
generating, by said computer processor enabling an analyzer component, a service interface associated with said service interface operation parameters, said service operation request, and said service operation response, said service interface comprising a hardware and software component;
deploying said service interface such that said SOA is interfaced, via said network, to said plurality of database computing systems;
measuring by said computer processor, characteristics of said service interface;
fitting, by said computer processor enabling said analyzer component, said reusability patterns within said service interface;

generating, by said computer processor, said service components within said SOA;

removing, by said computer processor based on said business affinity (BA) levels of said table, at least one sub object of said sub-objects;

improving, by said computer processor based on results of said measuring, said removing, said building, and said fitting, said service components of said SOA and said service interface with respect to computer architecture of a factory;

receiving, by said computer processor, valency bands;

generating a software application comprising said valency bands and said reusability patterns built into said software application;

receiving, by said computer processor, nesting levels associated with said valency bands;

receiving, by said computer processor, a service operation request associated with said service and said valency bands;

retrieving, by said computer processor, a group of said data objects and associated attributes of said attributes;

computing, by said computer processor, nesting levels for said group of said data objects and said associated attributes;

associating, by said computer processor, said associated attributes with said valency bands;

computing, by said computer processor based on results of said associating, a valency variation percentage associated with each of said valency bands;

presenting, by said computer processor to a user, said valency variation percentage;

receiving, by said computer processor, a service operation request associated with said service;

comparing, by said computer processor, said service operation request to said report;

retrieving, by said computer processor based on results of said comparing said service operation request to said report, a group of said data objects and associated attributes of said attributes;

comparing, by said computer processor, each data object of said group of said data objects to said associated attributes;

identifying, by said computer processor based on results of said comparing each data object, varying elements associated with said group of said data objects and said associated attributes;

computing, by said computer processor based on results of said identifying, a data variation percentage associated with said service operation request;

displaying, by said computer processor via a computer screen to a user, said data variation percentage;

receiving, by said computer processor from said user via said input device, responses associated with said data variation percentage;

computing, by said computer processor based on said responses, a response data variation percentage;

displaying, by said computer processor via said computer screen to said user, said response data variation percentage; and combining, based on execution of said software application, said service interface with said service components within said SOA such that a hardware and software architectural system is generated.

7. The computer program product of claim 6, further comprising:

receiving, by said computer processor, data domains and aggregations associated with a service operation request and a service operation response;

receiving, by said computer processor, composite service specifications associated with said data domains and said aggregations;

receiving, by said computer processor, service models associated with said informational model;

analyzing, by said computer processor, said data domains and said aggregations with respect to said composite service specifications and said service models;

determining, by said computer processor, that a group of said aggregations is associated with multiple domains of said data domains; and generating, by said computer processor, a message indicating a status of service factorization associated with results of said determining.

8. The computer program product of claim 6, further comprising:

receiving, by said computer processor, data domains and aggregations associated with a service operation request and a service operation response;

receiving, by said computer processor, a permissible data count associated with said data domains and said aggregations;

receiving, by said computer processor, service specifications associated with said data domains and said aggregations;

receiving, by said computer processor, service models associated with said informational model;

analyzing, by said computer processor, said data domains and said aggregations with respect to said service specifications and said service models;

determining, by said computer processor, that a group of said aggregations is associated with multiple domains of said data domains;

determining, by said computer processor, that said group of said aggregations is associated with an additional service associated with multiple domains of said data domains;

performing, by said computer processor, a data element count for said group of said aggregations;

determining, by said computer processor, if said data element count is within an allowable band; and generating, by said computer processor based on result of said determining if said data element count is within an allowable band, a message indicating if said data element count is within an allowable band.

9. The computer program product of claim 6, further comprising:

retrieving, by said computer processor, a group of said data objects and associated attributes of said attributes associated with said service operation request and said service operation response;

performing, by said computer processor, a reusability pattern count for said reusability patterns; and presenting, by said computer processor to a user, results of said reusability pattern count.

10. A computing system comprising a plurality of internal and external databases and a computer processor coupled to a computer-readable memory unit, said memory unit comprising instructions that when executed by the computer processor implements an interface improvement method comprising:

receiving within said plurality of internal and external databases via an input device and a network, by said computer processor, an informational model comprising data objects, attributes, and relationships associated with a service, wherein said data objects comprise sub-objects, and wherein each of said plurality of database computing systems comprises a particular configuration of hardware comprising said plurality of internal and external databases;

receiving, by said computer processor, business affinity (BA) band data associated with said data objects;

receiving, by said computer processor, threshold levels associated with said business affinity (BA) band data;

receiving, by said computer processor, business affinity (BA) levels associated with said business affinity (BA) band data and said sub-objects, wherein said receiving said business affinity (BA) levels comprises receiving a table comprising said business affinity (BA) levels, wherein said table comprises a plurality of rows and a plurality of columns intersecting said plurality of rows to define said business affinity (BA) levels, and wherein said table enables storage of (BA) levels thereby providing a sematic cohesion between said sub-objects;

receiving, by said computer processor, service interface operation parameters;

computing, by said computer processor, a business affinity (BA) for said informational model, wherein said computing is based on said business affinity (BA) band data, said threshold levels, said business affinity (BA) levels, and said service interface operation parameters;

generating, by said computer processor, a report indicating recommended sub-objects of said sub-objects;

presenting, by said computing system via a plotter of said plurality of database computing systems, said report;

receiving, by said computer processor, reusability patterns associated with a service operation request for generating service components for a service oriented architecture (SOA) and a service operation response;

building, by said computer processor based on said reusability patterns, said service components;

generating, by said computer processor enabling an analyzer component, a service interface associated with said service interface operation parameters, said service operation request, and said service operation response, said service interface comprising a hardware and software component;

deploying said service interface such that said SOA is interfaced, via said network, to said plurality of database computing systems;

measuring by said computer processor, characteristics of said service interface;

fitting, by said computer processor enabling said analyzer component, said reusability patterns within said service interface;

generating, by said computer processor, said service components within said SOA;

removing, by said computer processor based on said business affinity (BA) levels of said table, at least one sub object of said sub-objects;

improving, by said computer processor based on results of said measuring, said removing, said building, and said fitting, said service components of said SOA and said service interface with respect to computer architecture of a factory;

receiving, by said computer processor, valency bands;

generating a software application comprising said valency bands and said reusability patterns built into said software application;

receiving, by said computer processor, nesting levels associated with said valency bands;

receiving, by said computer processor, a service operation request associated with said service and said valency bands;

retrieving, by said computer processor, a group of said data objects and associated attributes of said attributes;

computing, by said computer processor, nesting levels for said group of said data objects and said associated attributes;

associating, by said computer processor, said associated attributes with said valency bands;

computing, by said computer processor based on results of said associating, a valency variation percentage associated with each of said valency bands;

presenting, by said computer processor to a user, said valency variation percentage;

receiving, by said computer processor, a service operation request associated with said service;

comparing, by said computer processor, said service operation request to said report;

retrieving, by said computer processor based on results of said comparing said service operation request to said report, a group of said data objects and associated attributes of said attributes;

comparing, by said computer processor, each data object of said group of said data objects to said associated attributes;

identifying, by said computer processor based on results of said comparing each data object, varying elements associated with said group of said data objects and said associated attributes;

computing, by said computer processor based on results of said identifying, a data variation percentage associated with said service operation request;

displaying, by said computer processor via a computer screen to a user, said data variation percentage;

receiving, by said computer processor from said user via said input device, responses associated with said data variation percentage;

computing, by said computer processor based on said responses, a response data variation percentage;

displaying, by said computer processor via said computer screen to said user, said response data variation percentage; and combining, based on execution of said software application, said service interface with said service components within said SOA such that a hardware and software architectural system is generated.

11. The computing system of claim 10, further comprising:

receiving, by said computer processor, data domains and aggregations associated with a service operation request and a service operation response;

receiving, by said computer processor, composite service specifications associated with said data domains and said aggregations;

receiving, by said computer processor, service models associated with said informational model;

analyzing, by said computer processor, said data domains and said aggregations with respect to said composite service specifications and said service models;

determining, by said computer processor, that a group of said aggregations is associated with multiple domains of said data domains; and generating, by said computer processor, a message indicating a status of service factorization associated with results of said determining.

12. The computing system of claim 10, further comprising:
- receiving, by said computer processor, data domains and aggregations associated with a service operation request and a service operation response;
- receiving, by said computer processor, a permissible data count associated with said data domains and said aggregations;
- receiving, by said computer processor, service specifications associated with said data domains and said aggregations;
- receiving, by said computer processor, service models associated with said informational model;
- analyzing, by said computer processor, said data domains and said aggregations with respect to said service specifications and said service models;
- determining, by said computer processor, that a group of said aggregations is associated with multiple domains of said data domains;
- determining, by said computer processor, that said group of said aggregations is associated with an additional service associated with multiple domains of said data domains;
- performing, by said computer processor, a data element count for said group of said aggregations;
- determining, by said computer processor, if said data element count is within an allowable band; and
- generating, by said computer processor based on result of said determining if said data element count is within an allowable band, a message indicating if said data element count is within an allowable band.

13. The computing system of claim 10, further comprising:
- retrieving, by said computer processor, a group of said data objects and associated attributes of said attributes associated with said service operation request and said service operation response;
- performing, by said computer processor, a reusability pattern count for said reusability patterns; and
- presenting, by said computer processor to a user, results of said reusability pattern count.

14. The method of claim 1, wherein performing the method comprises executing computer code by the processor, and wherein a hardware storage device of the computing system includes a read only memory (ROM) that stores the computer code.

* * * * *